United States Patent [19]

Harben, Jr. et al.

[11] Patent Number: 4,570,293
[45] Date of Patent: Feb. 18, 1986

[54] PEELER ROLL CONSTRUCTION

[76] Inventors: Grover S. Harben, Jr., Edgewater Ave., Gainesville, Ga. 30501; Robert J. Sosebee, Rte. 1, Gillsville, Ga. 30543

[21] Appl. No.: 567,737

[22] Filed: Jan. 3, 1984

[51] Int. Cl.$^4$ .............................................. A22C 21/00
[52] U.S. Cl. ............................................ 17/11; 17/21
[58] Field of Search ..................... 17/11, 21; 130/5 D, 130/5 G, 5 H, 5 J

[56] References Cited

U.S. PATENT DOCUMENTS

| | | | |
|---|---|---|---|
| 2,328,607 | 9/1943 | Borchers | 130/5 G |
| 2,656,666 | 10/1953 | Collins | 130/5 J |
| 3,119,144 | 1/1964 | Hill | 17/11 C |

Primary Examiner—Willie G. Abercrombie
Attorney, Agent, or Firm—B. J. Powell

[57] ABSTRACT

Gizzard peeling apparatus including a pair of rolls with intermeshing helical teeth and bores in the opposite ends of each. A sleeve bearing is mounted in each bore and a support shaft is rotatably mounted in each bearing to rotatably support the rolls between supports.

7 Claims, 3 Drawing Figures

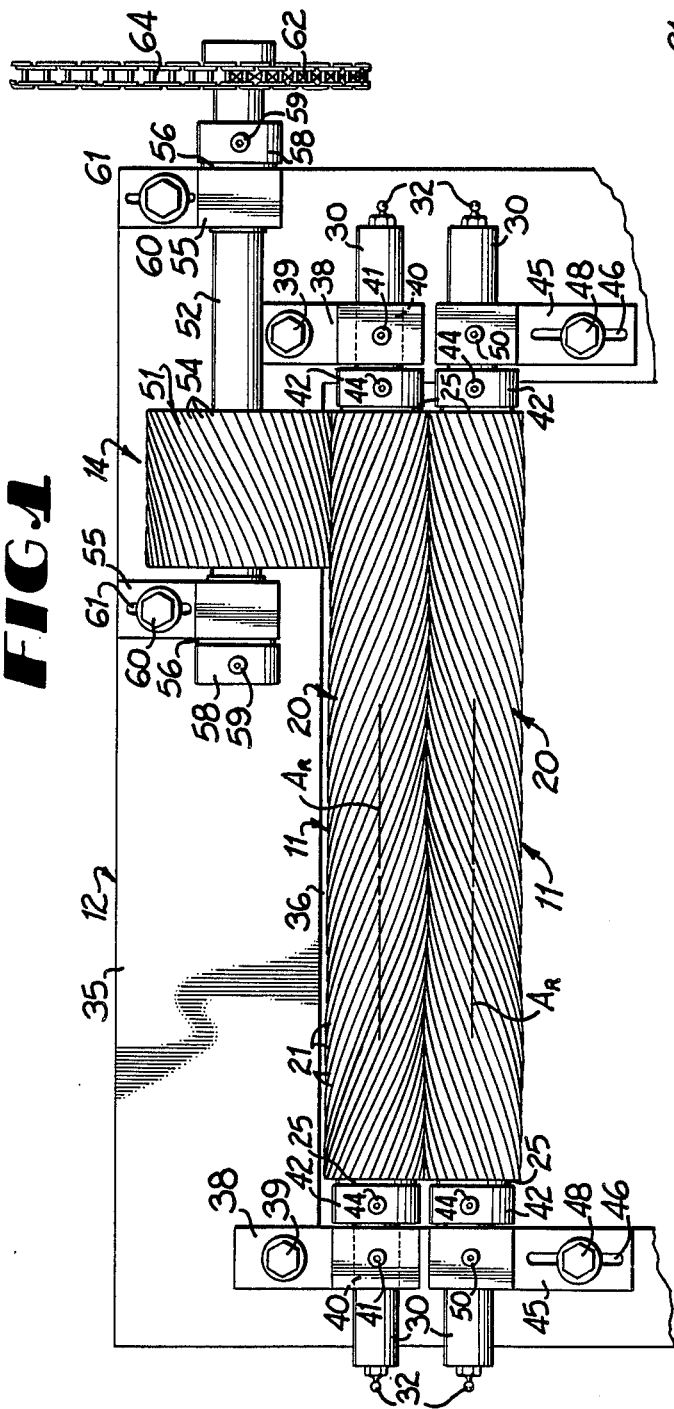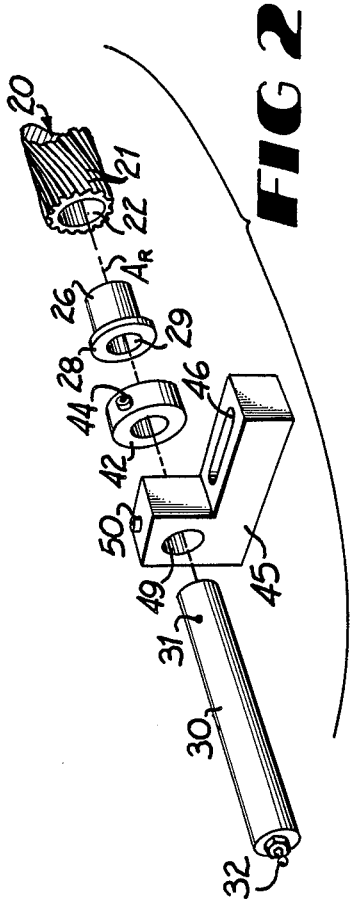
FIG 1
FIG 2
FIG 3

PEELER ROLL CONSTRUCTION

BACKGROUND OF THE INVENTION

This invention relates generally to apparatus for processing poultry gizzards and more particularly to gizzard peeling apparatus for removing of the lining from the gizzard using toothed peeler rolls.

After poultry gizzards are opened and cleaned, it is necessary to remove the lining from the edible portion of the gizzard to produce an edible product. The lining is removed from the edible portion of the gizzard using toothed peeler rolls which have helically extending teeth therearound where the teeth on the two rolls drivingly intermesh to grip the lining on the gizzard therebetween and strip it from the edible portion of the gizzard. Heretofore, these peeler rolls have been made with integral reduced diameter shaft ends thereon around which a bearing is placed to rotatably support the roll. In order to achieve a working hardness in the teeth on these peeler rolls, they are heat treated.

This construction has created problems with the rolls and their use. One of these problems is that the heat treatment process made the shaft ends subject to premature failure where they joined with the toothed section of the roll. Another of these problems is that is is exceedingly difficult to make the shaft ends perfectly aligned with each other about a common axis and to maintain that alignment during heat treatment. When the rolls with nonaligned shaft ends are mounted, the toothed section thereon is rotated about an axis eccentrically of the centerline of the toothed section. Since the rolls are used in pairs with intermeshing teeth, there has been a tendency to bind and increase the stresses at the shaft end/toothed section juncture. This has also made the mounting and adjustment of the peeler rolls difficult to do.

SUMMARY OF THE INVENTION

These and other problems and disadvantages associated with the prior art are overcome by the invention disclosed herein and by providing a peeler roll construction in which the toothed roll always rotates about a fixed rotational axis and in which the roll can be heat treated to achieve the desired hardness in the teeth without causing premature failure in the shafts supporting the roll.

The peeler roll construction includes a toothed peeler roll defining helically extending teeth around the periphery thereof which are adapted to drivingly engage the complimentary teeth on another of the peeler rolls to remove the lining from the edible portions of the gizzards. The peeler roll defines a bore in each of the ends thereof which opens onto the end of the peeler roll. The bore is located concentrically of the central axis of the roll and its concentricity is not significantly affected by the heat treatment. As a result, the peeler roll can be heat treated to the desired hardness.

To support the peeler roll, a pair of bearings are press fitted into the bores in the opposite ends of the roll and the bearings are rotatably supported on a pair of spaced apart support shafts so that the bearings and the peeler roll can rotate thereon. This allows the support shafts to be made at the proper strength to support the peeler roll without being affected by the heat treating process of the peeler roll itself so that premature failure of the peeler roll/support shaft interface is not encountered. It will also be seen that the peeler roll will always rotate about a fixed axis extending between the two support shafts even though the axes of the two support shafts may be slightly misaligned with respect to each other. Thus, stresses due to misalignment of the support shafts are virtually eliminated.

Further, the tooth shape and spacing of the teeth on the peeler rolls is selected so that the teeth are self cleaning. As a result, the peeler rolls can be driven with a complimentary larger diameter drive gear without the carry over of material removed from the gizzard back onto the tops of the peeler rolls. The larger diameter drive gear permits the stress induced by the drive to be absorbed thereby without unduly stressing the peeler rolls.

These and other features and advantages of the invention will become more clearly understood upon consideration of the following detailed description and accompanying drawings wherein like characters of reference designate corresponding parts throughout the several views and in which:

BRIEF DESCRIPTION OF THE DRAWINGS

FIG. 1 is a top plan view illustrating the gizzard peeling device incorporating the invention;

FIG. 2 is an exploded perspective view of a portion of the peeler roll construction illustrating the internal construction thereof; and FIG. 3 is a longitudinal cross-sectional view of one of the ends of the peeler roll showing the mounting thereof.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Referring to FIG. 1, it will be seen that the gizzard peeler 10 includes a pair of peeler roll assemblies 11 which drivingly engage each other and are supported on a support assembly 12. The peeler roll assemblies 11 are driven by a driving gear assembly 14 from a conventional power source (not shown), usually a motor and gear reducer. An unpeeled but opened and washed gizzard is dropped onto the top of the peeler roll assemblies 11. The roll assemblies 11 grip the lining and pull it downwardly therebetween to remove it from the edible portions of the gizzard which ride on top of the peeler roll assemblies 11.

Each of the peeler roll assemblies 11 includes an elongate cylinderical peeler roll 20 which defines a plurality of helically extending teeth 21 thereon that extend along the length of the peeler roll 20. It will be appreciated that the teaching of this invention can be applied to peeler constructions which have an infeed section at one end thereof such as those disclosed in U.S. Pat. No. 3,480,991 without departing from the scope of the invention.

Surprisingly, it has been found that using an invalute tooth from for the teeth 21 with a pressure angle of at least 25° results in the teeth being self cleaning. As a result, no auxiliary cleaning equipment is required under the rolls to make sure that the lining material removed from the gizzard and passing down between the rolls does not wedge between the teeth 21 as is common with prior art peeler rolls. The outside diameter of the rolls 20 illustrated is about 1.27 inches with the teeth 21 having a diametrical pitch of about 20, a helix angle of about 22° a tooth depth of about 0.086 inch and a pressure angle of about 30°.

A bore 22 is formed in the opposite ends of the roll 20 and opens onto the end of the roll. The bore 22 is concentric about the roll axis $A_R$ so that the roll 20 will rotate about the roll axis $A_R$ as will become more apparent. The bore 22 has a convenient depth and is illustrated at about 1-1.5 inches. The diametrical difference between the bore 22 and the root diameter of the teeth 21 is sufficient to insure that the roll 20 will not prematurely fracture in this area. The roll 20 illustrated has a diametrical difference of about 0.25-0.4 inches between the bore diameter and the root diameter of the teeth 21.

A bearing 25 which has a cylindrical section 26 sized to be press fitted into the bore 22 is press fitted therein so that the enlarged thrust flange 28 on the end of the bearing 25 bears against the end of the roll 20. This serves to fix the bearing 25 with respect to the roll 20 so that the bearing 25 rotates therewith. The bearing 25 defines a passage 29 therethrough so that the bearing 25 can be internally supported. While different materials may be used for the bearing 25, a bronze bushing material may be used. The internal diameter of the passage 29 may be varied but is illustrated in about $\frac{5}{8}$ inch.

Rotatably received in the passage 29 through the bearing 25 is a support shaft 30 which projects outwardly of the bearing 25 so that the shaft 50 can be supported. The diameter of the shaft 30 is selected so that it rotatably supports the bearing 25 and thus the end of the roll 20 thereon. The shaft 30 is typically provided with a grease passage 31 therein as best seen in FIG. 2 which communicates with a grease fitting 32 on the projecting end of the shaft 30 so that the shaft/bearing interface can be lubricated in known manner.

The support assembly 12 includes a mounting base 35 as best seen in FIG. 1 which defines a cutout 36 therein under the peeler roll assemblies 11 so that the lining material removed from the edible portions of the gizzard can drop through the cutout 36 for disposal. The support shafts 30 on one of the peeler roll assemblies 11 are supported in nonadjustable support blocks 38 positioned at opposite ends of the cutout 36. The support blocks 38 have mounting sections thereon adapted to be fixedly attached to the base 35 by any convenient means such as the bolts 39. Each support block 38 has an upstanding section thereon defining a passage 40 therethrough shown by dashed lines in FIG. 1 through which one of the support shafts 30 can be slidably received. The support block 38 is also provided with a set screw 41 which can be tightened to fixedly lock the shaft 30 in the support block 38.

To keep the peeler roll 20 axially positioned between the support blocks 38, a pair of set collars 42 is provided with one being mounted on each of the support shafts 30 between the support block 38 and the end of the peeler roll 20. The set collar 42 has a set screw 44 therein to selectively lock the collar onto the shaft 30. Thus, the set collars 42 are positioned on the shafts 30 so that they abut the thrust flange 28 of the bearings 25 in the ends of the roll 20 and are locked onto the shafts 30 using the set screws 44 to locate the roll 20 axially of the rotational axis $A_R$ thereof.

It will be appreciated that any slight misalignment between the axes of the shafts 30 will typically be taken up in the running clearance between the shaft 30 and the bearing 25 so that the peeler roll 20 is not unduly stressed. Further, it will be appreciated that the peeler roll 20 always rotates about the axis $A_R$ since the bores 22 are coaxially located with respect to the axis $A_R$. Thus, even though the shafts 30 may be slightly out of alignment, this misalignment does not affect the operation of the roll 20.

The other peeler roll assembly 11 is mounted between a pair of adjustable support blocks 45 positioned on opposite sides of the cutout 36 in the base 35. The adjustable support blocks 45 each have a mounting leg thereon which defines an elongate adjustment slot 46 therein to allow the support blocks 45 to be moved toward and away from the nonadjustment support blocks 38 yet can be clamped in position using the mounting bolts 48 extending through the slots 46. Each of the adjustable bearing blocks 45 have an upstanding portion on the end thereof which defines a support passage 49 seen in FIG. 2 therethrough sized to receive the support shaft 30 therein. The adjustable support block 45 is provided with a set screw 50 to selectively lock the support shaft 30 in position in the passage 49. The peeler roll assembly 11 is mounted in the adjustable support blocks 45 similarly to the way the peeler roll assembly 11 is mounted in the nonadjustment block 38. The peeler roll 20 is axially located between the adjustable support blocks 45 by set collars 42 using the set screws 44 therein. The running clearance between the peeler rolls 20 and the peeler roll assembly 11 can thus be adjusted by loosening the bolts 48 and moving the adjustable support blocks 45 toward or away from the fixed support blocks 38.

It will be appreciated that the peeler roll assemblies 11 may be driven by fixedly mounting a support shaft in one end of one of the rolls 20. A drive sprocket then may be attached directly to the fixedly mounted support shaft to drive both of the peeler roll assemblies 11 since driving one of the peeler rolls 20 inherently drives both of them through the intermeshing of the teeth 21.

The peeler rolls assemblies 11 may also be driven using the driving gear assembly 14. The driving gear assembly 14 includes a drive gear 51 fixedly mounted on support shaft 52. The drive gear 51 defines a plurality of helically extending teeth 54 therearound adapted to drivingly mesh with the teeth 21 on one of the peeler rolls 20, usually the peeler roll 20 mounted between the fixed support blocks 38 as illustrated in FIG. 1. The shaft 52 is appropriately mounted in bearing blocks 55 equipped with bearings 56 so that the rotational axis of the gear 51 is substantially parallel to the axis $A_R$ of the peeler roll assembly 11 with which it meshes. The gear 51 can be located lengthwise of the peeler roll 20 using the set collars 58 on the shaft 52 and the set screws 59 therein. The running clearance between the peeler roll 20 and the drive gear 51 can be adjusted with the bolts 60 connecting the bearing blocks 55 to the base 35 through slots 61 therein. The end of shaft 52 projecting out past the base 35 mounts a drive sprocket 62 thereon which is driven by chain 64 connected to the known power source. It will be appreciated that the face width of gear 51 is much less than the face width of the peeler rolls 20. The face width of the peeler rolls 20 illustrated is about 10 inches whereas the face width of the gear 51 is about 2 inches. This gives enough bearing contact between the teeth 54 on the gear 51 and the teeth 21 on the roll 20 to keep the driving stresses low enough not to damage the teeth on either the gear 51 or the peeler roll 20. It will also be appreciated that the diameter of the drive gear 51 is considerably greater than the diameter of the peeler rolls 20 and is illustrated at about twice the diameter of the peeler rolls 20. This larger diameter for the gear 51 gives more clearance between the mounting of the gear 51 and the rolls 20 to facilitate assembly and adjustment.

What is claimed as invention is:

1. A peeler roll construction adapted to be used in pairs for removing the lining from gizzards comprising a solid toothed roll having opposed ends and defining helically extending teeth around the periphery thereof adapted to drivingly engage another of said toothed rolls complimentary thereto to remove the linings from gizzards, said toothed roll defining a pair of bores therein in the opposite ends thereof of a prescribed depth, each of said bores located concentrically of the central axis of said roll and opening onto the end of said roll whereby said roll can be supported through said bores for rotation about the central axis of said roll; a pair of sleeve bearings, one of said sleeve bearings positioned in each of said bores, and each of said sleeve bearings defining a passage therein; and a pair of support shafts, one of said support shafts positioned in said passage of one of said bearings and projecting outwardly of the end of said roll and the other of said support shafts positioned in said passage of the other of said bearings and projecting outwardly of the end of said roll opposite the first mentioned support shaft so that said bearings rotatably support one end of said roll on one of said support shafts and rotatably support the other end of said roll on the other of said support shafts whereby said bearings permit slight misalignment of said support shafts without significantly stressing said roll and said support shafts.

2. A peeler roll construction for use in removing the linings from gizzards comprising:
   a pair of toothed rolls defining helically extending complimentary teeth around the periphery thereof with the teeth drivingly engaging each other to grip and remove the linings from gizzards, each of said toothed rolls defining a pair of bores therein in the opposite ends thereof, each of said bores located concentrically of the central axis of said roll, having a prescribed depth and opening onto the end of said roll;
   a first pair of support shafts, one being positioned in each of said bores in one of said toothed rolls and projecting outwardly thereof;
   a second pair of support shafts, one being positioned in each of said bores in the other of said toothed rolls and projecting outwardly thereof; and
   a plurality of sleeve bearings, one of said sleeve bearings positioned in each of said bores in said rolls between said shafts and said rolls to rotatably support each of said rolls on said shafts so that said one of said toothed rolls is rotatably mounted between said first pair of support shafts and said other of said toothed rolls is rotatably mounted between said second pair of support shafts and so that stresses caused by slight misalignment of said support shafts with respect to the central axis of said roll are significantly reduced.

3. The peeler roll construction of claim 2 further including support means for supporting said first and second pairs of support shafts with respect to each other exteriorly of said rolls so that the teeth on said toothed rolls drivingly engage each other.

4. The peeler roll construction of claim 3 wherein each of said support shafts is adjustably mounted in said support means and further including locking means for selectively fixing said support shafts with respect to said support means.

5. The peeler roll construction of claim 3 further including a plurality of set collars, one of said set collars being adjustably mounted on each of said support shafts for adjustment of said set collar axially of said support shaft to adjustably locate said toothed rolls lengthwise of said support shafts.

6. A peeler device for use in removing the linings from gizzards comprising:
   support means;
   a pair of toothed rolls rotatably mounted on said support means in a side-by-side relationship and defining complimentary helically extending teeth thereon drivingly engaging each other so that the linings from gizzards will be gripped between said toothed rolls and stripped from the edible portions of the gizzards; and
   a drive gear defining helically extending teeth around the periphery thereof complimentary to the teeth on one of said toothed rolls, said driving gear rotatably mounted on said support means so that the helically extending teeth thereon drivingly engage the helically extending teeth on said toothed roll to drivingly rotate said rolls.

7. The peeler construction of claim 6 wherein each of said toothed rolls define a pair of bores therein in the opposite ends thereof, each of said bores located concentrically of the central axis of said roll; and further including:
   a plurality of bearings, one of said bearings mounted in each of said bores and each of said bearings defining a passage therethrough concentric of the central axis of said roll; and
   a plurality of support shafts mounted on said support means, one of said support shafts rotatably received in the passage in each of said bearings so that said toothed rolls are rotatably supported between said support shafts.

* * * * *